(12) United States Patent
Yoon et al.

(10) Patent No.: US 6,832,860 B2
(45) Date of Patent: Dec. 21, 2004

(54) OPTICAL MODULE

(75) Inventors: Eung-yeoul Yoon, Suwon (KR); Jong-hwa Won, Suwon (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 43 days.

(21) Appl. No.: 10/184,985

(22) Filed: Jul. 1, 2002

(65) Prior Publication Data

US 2003/0002821 A1 Jan. 2, 2003

(30) Foreign Application Priority Data

Jun. 30, 2001 (KR) ........................................ 2001-38808

(51) Int. Cl.⁷ ................................................. G02B 6/42
(52) U.S. Cl. .............................. 385/88; 385/49; 385/51; 385/52; 385/91
(58) Field of Search .............................. 385/88, 49, 51, 385/52, 91

(56) References Cited

U.S. PATENT DOCUMENTS 5,434,939 A  7/1995  Matsuda
6,341,898 B1 * 1/2002  Matsushita .................... 385/88
6,625,372 B1 * 9/2003  Flanders et al. ............. 385/134

FOREIGN PATENT DOCUMENTS

JP         61-290413 A    12/1986

* cited by examiner

*Primary Examiner*—Dean A. Reichard
*Assistant Examiner*—Jinhee Lee
(74) *Attorney, Agent, or Firm*—Sughrue Mion, PLLC (57) ABSTRACT

An optical module includes a holder formed of a medium having light transmittance. The optical module further includes an optical device for converting an optical signal into an electric signal, and vice versa; a light guide member having a core being a path of the optical signal generated by the optical device, and a clad installed outside the core and for forming an interface from which the optical signal is reflected, together with the core; and a holder formed on an end of the light guide member for fixing the optical device and the light guide member of which optical axes are aligned with respect to the same point, the holder through which the optical signal can penetrate. In the optical module, the light guide member and the holder may be formed as a single body. The optical module can stably transmit an optical signal using the optical module and, further, be used in a variety of ways by changing the optical characteristics of the medium having light transmittance of the holder.

22 Claims, 7 Drawing Sheets

FIG. 1

PRIOR ART

OPTICAL MODULE

BACKGROUND OF THE INVENTION

1. Field of the Invention

The present invention relates to an optical module and, more particularly, to an optical module capable of stably transmitting an optical signal.

2. Description of the Related Art

An optical module is an optical device to be used in an optical communication and, more specifically, an assembly in which an optical fiber or an optical waveguide is aligned with respect to the optical axis of an optical device (light emitting device or light receiving device) and connected thereto. In the optical module, an electrical signal is converted into an optical signal to be transmitted to the optical fiber or an optical waveguide, or an optical signal received from the optical fiber or the optical waveguide is converted into an electric signal to be transmitted.

An optical fiber is formed of a slender single wire or a bundle of wires of glass or synthetic resin. An optical fiber made of glass is formed to a thickness of 3~60 $\mu$m and an optical fiber made of synthetic resin is formed to a thickness of 100 $\mu$m~10 mm. Also, an optical fiber is composed of a core, which has a high refractive index and is formed on a central portion of the optical fiber, and a clad, which has a low refractive index and is formed on an outer portion of the optical fiber. A light, which is incident on an optical fiber, is totally reflected from an interface between the core and the clad and is propagated only to the core. The optical fiber is a light communication path in which a relay interval can be lengthened while a loss in light is minimized; the optical fiber is used in the optical communication as described above.

The optical waveguide is included in a housing in which the optical fiber is made of silicon or polymer, and is used mainly for transmitting an optical signal over a short distance.

For instance, in a conventional optical module disclosed in U.S. Pat. No. 5,434,939, an optical fiber is inserted into a guiding hole, which is formed to face a surface emitting laser in a substrate having the surface emitting laser, and fixed by an adhesive.

Figure 1:
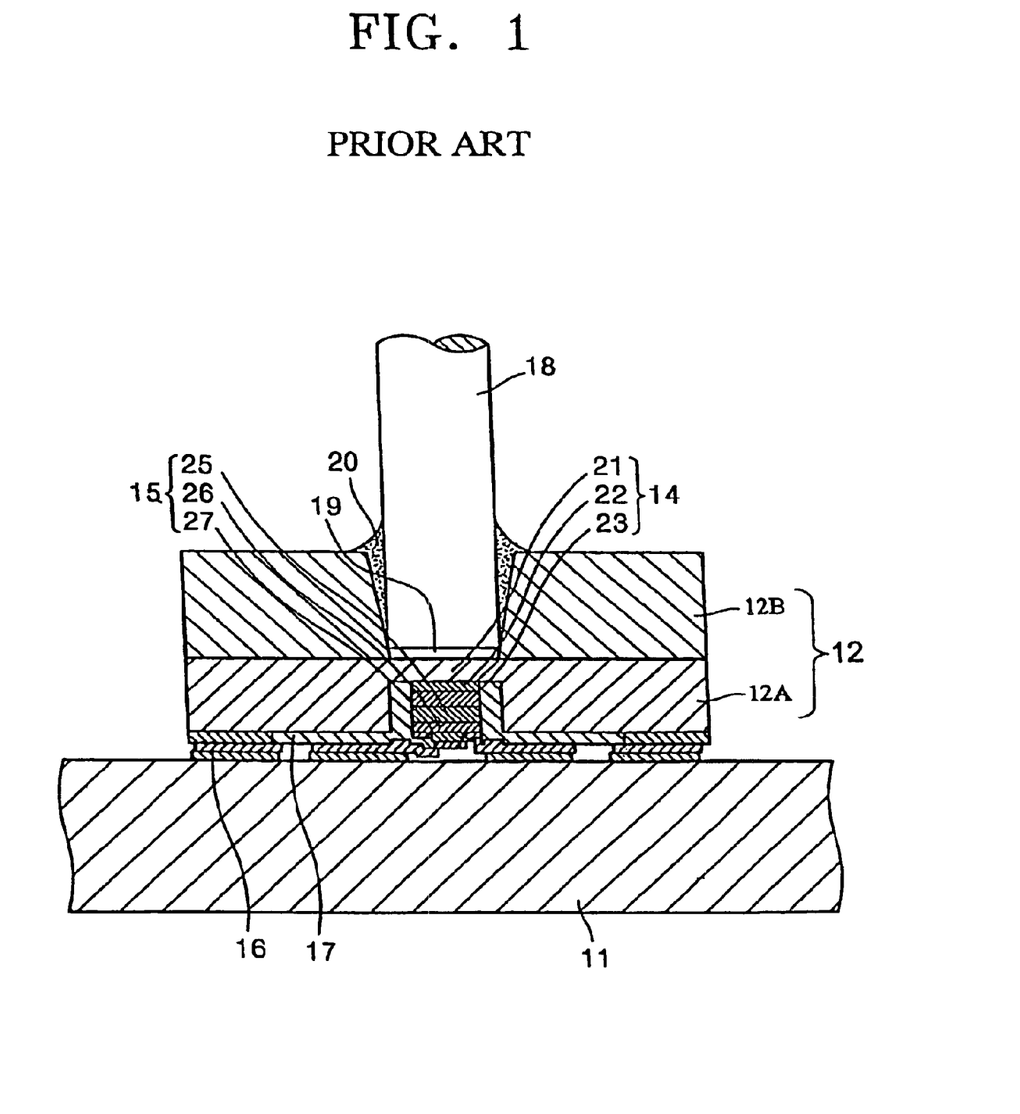
FIG. 1 shows a conventional optical module.

FIG. 1 shows a structure of a conventional optical module. In FIG. 1, the optical module includes: an electric circuit substrate 11 with anodes 16 and insulator film 17; a light emitting chip 12 installed on the electric circuit substrate 11 and including first and second layers 12A and 12B; a surface emitting laser 14, which has a p-type mirror 21, an active layer 22 and an n-type minor 23, and which is installed in the first layer 12A of the light emitting chip 12 and electrically connected to the electric circuit substrate 11; an open guiding hole 19 aligned with respect to the surface emitting laser 14 and formed in the second layer 12B of the light emitting chip 12, i.e. the second layer 12B comprises a semiconductor substrate; and an optical fiber 18 optically connected to the surface emitting laser 14 and inserted into the guiding hole 19.

The voltage of the surface emitting laser 14 is amplified by a bipolar transistor 15 installed at a lower portion thereof, comprising a collector 25, a base 26 and an emitter 27. The amplified voltage is transmitted to the surface emitting laser 14 and a laser beam is emitted in the surface emitting laser 14. As a result, an optical signal is generated and travels toward the optical fiber 18.

However, in the above conventional optical module, an adhesive 20 used to fasten the optical fiber 18 in the guiding hole 19 may leak in the guiding hole 19. If this happens, an optical signal generated from the surface emitting laser 14 may be blocked from transmission to the optical fiber 18 by the adhesive 20. Further, when the optical fiber 18 is not firmly fastened in the guiding hole 19, the position of the optical fiber 18 will change, thereby preventing an optical signal from being entirely transmitted to the optical fiber 18 from the surface emitting laser 14.

In addition, the conventional optical module is configured in that the guiding hole 19 is installed in the semiconductor substrate 12B, which requires an additional manufacturing process. Accordingly, the conventional optical module is difficult to make and manufacture.

SUMMARY OF THE INVENTION

To solve the above-described problem, it is an aspect of the present invention to provide an optical module, which is mass-produced at a low cost and is extensively used, and is capable of transmitting an optical signal stably and completely.

An apparatus consistent with the present invention relates to an optical module comprising an optical device which converts an optical signal into an electric signal, and vice versa, a light guide member having a core and a clad for forming an interface from which the optical signal is reflected where the core is a path of the optical signal generated by the optical device, and the clad is installed outside the core, and a holder formed on an end of the light guide member, for fixing the alignment of the optical device and the light guide member along the optical axes with respect to the same point, the holder through which the optical signal can penetrate.

To further solve the above-described problem, it is an aspect of the present invention to provide an optical module comprising an optical device which converts an optical signal into an electric signal, and vice versa; and a light guide member and a holder, through which the optical signal generated by the optical device is transmitted, the light guide member and the holder being attached to the optical device, wherein the light guide member and the holder comprise a core, which is a path of an electric signal, and a clad formed outside the core, wherein the core and the clad form an interface from which the optical signal is reflected.

The optical device is one of a light emitting device and a light receiving device.

The light guide member is formed of an optical fiber or optical waveguide.

The holder is formed of poly-methylmethacrylate (PMMA) or epoxy.

The optical module may further include terminals as paths for transmitting and receiving electrical signals from the optical device.

An optical module according to the present invention has advantages of stably transmitting an optical signal because an optical device and a light guide member are fastened by a holder formed of a medium having a light transmittance.

BRIEF DESCRIPTION OF THE DRAWINGS

The above aspect and advantages of the present invention will become more apparent by describing in detail illustrative and non-limiting embodiments thereof with reference to the accompanying drawings, in which.

DETAILED DESCRIPTION OF THE INVENTION

The present invention will now be described in detail by describing illustrative, non-limiting embodiments thereof with reference to the accompanying drawings. In the drawings, the same reference characters denote the same elements.

Figure 2A:
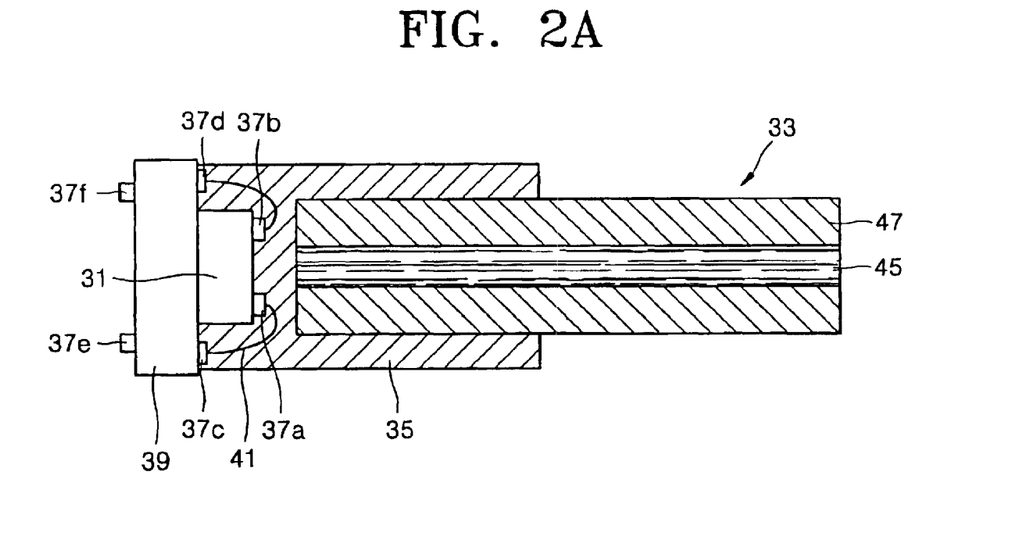
FIG. 2A is a cross-sectional view of an optical module according to the first illustrative and non-limiting embodiment of the present invention.
Figure 2B:
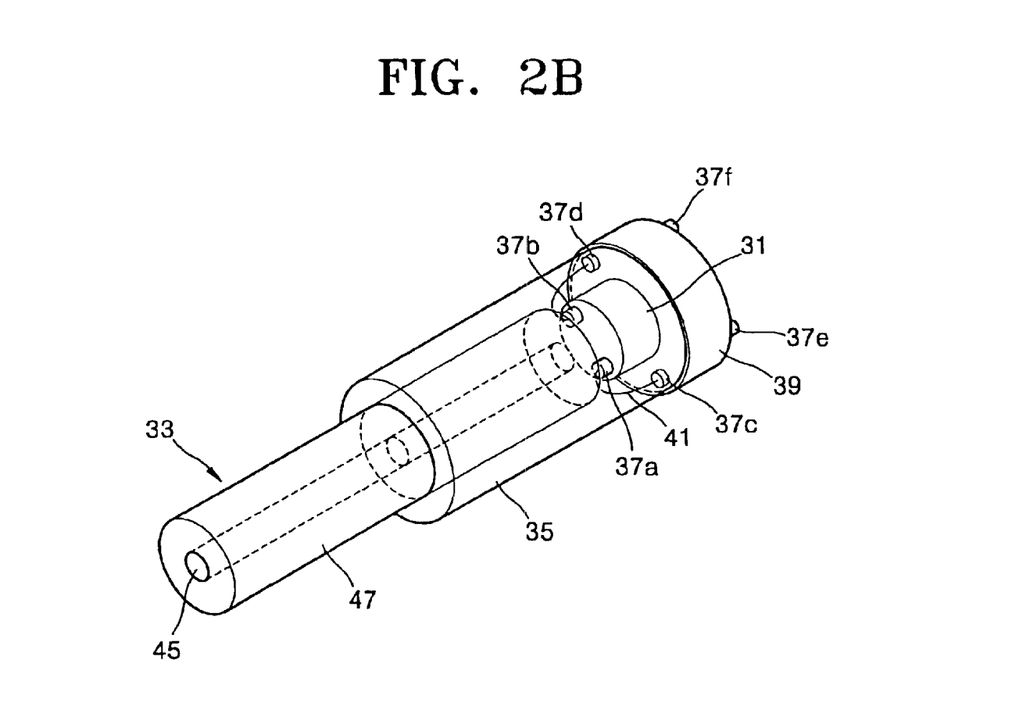
FIG. 2B is a perspective view of the optical module according to the first illustrative and non-limiting embodiment of the present invention.

FIGS. 2A and 2B show an optical module according to the first illustrative, non-limiting embodiment of the present invention, which includes: an optical device 31 for converting an optical signal into an electric signal, and vice versa; a light guide member 33 which is a path to which an optical signal is transmitted by the optical device 31; and a holder 35 formed on an end of the light guide member 33 to fix the optical axes of the optical device 31 and the light guide member 33 of which optical axes are aligned with respect to the same point, and through which an optical signal is transmitted.

The light guide member 33 includes a core 45, which has a high refractive index and is a path through which the optical signal is transmitted, and a clad 47, which has a low refractive index and is formed outside the core 45. An optical signal is reflected from an interface between the core 45 and the clad 47.

Also, this optical module further includes a substrate 39 to contact the holder 35, in which the optical device 31 is installed.

First through sixth terminals 37a through 37f, which are paths of an electric signal, are installed on the substrate 39 and the optical device 31, which is a light emitting and light receiving device. Also, a wire 41 is connected to the terminals 37a through 37f, through which an electric signal is transmitted.

An electric signal supplied from the terminals 37a through 37f is converted into an optical signal in the light emitting device 31 and then transmitted to the light guide member 33. The optical signal transmitted to the light guide member 33 passes through the core 45 included in the light guide member 33 and is transmitted to the light receiving device 31 facing one side of the light guide member 33. The optical signal incident upon the light-receiving device 31 is converted into an electric signal and transmitted to the terminals 37a through 37f.

Although a portion of the holder 35 is interposed between the light guide member 33 and the optical device 31, the holder 35 is formed of a medium having optical transmittance of 90% or more, and further, a distance between the optical device 31 and the light guide member 33 is very short. Accordingly, an optical signal transmitted to the optical device 31 can almost entirely be transmitted to the light guide member 33.

The light emitting device 31 may, for example, comprise a laser diode (LD), a liquid emitting diode (LED), a vertical cavity surface emitting laser (VCSEL) and so on, and converts an electric signal into an optical signal and transmits the converted signal. The light-receiving device may, for example, comprise an avalanche photo diode (APD), a PIN photo diode and so on, and receives an optical signal and converts it into an electric signal.

The first and second terminals 37a and 37b are formed on the optical device 31. The third and fourth terminals 37c and 37d, which are formed around the optical device 31 on the substrate 39, are electrically connected to the first and second terminals 37a and 37b by the wire 41, respectively. Also, the fifth and sixth terminals 37e and 37f, which are formed on a lower portion of the substrate 39, are electrically connected to the third and fourth terminals 37c and 37d, respectively.

An optical fiber or an optical waveguide may be used as the light guide member 33. The light guide member 33 is used to transmit an information signal or an image signal or an optical power. An optical fiber and an optical waveguide are mainly used in a long-distance optical communication and in a short-distance optical communication, e.g. within a distance of 10 cm, respectively.

The holder 35 is a means for connecting the light guide member 33 and the optical device 31 as described above, and is formed of a medium with a light transmittance to deliver an optical signal transmitted from the optical device 31 to the light guide member 33. PMMA, polyperfluorinated butenylvinylether and epoxy, which are generally used in manufacturing an optical lens, can be used as a medium having the light transmittance.

The holder 35 is fused to be attached to the optical device 31 and the light guide member 33. To stably transmit an optical signal, the optical axes of the optical device 31 and the light guide member 33 must be aligned with respect to the same point in the holder 35. After the alignment, the fused holder 35 is hardened to fix the optical device 31 and the light guide member 33.

The holder 35 can be used in a variety of ways if the optical characteristics of a medium are changed. For instance, when the intensity of an optical signal transmitted from the optical device 31 is very strong, the holder 35 is preferably formed of a medium having a high refractive index so that it functions as an attenuator for weakening the intensity of the optical signal.

Figure 3A:
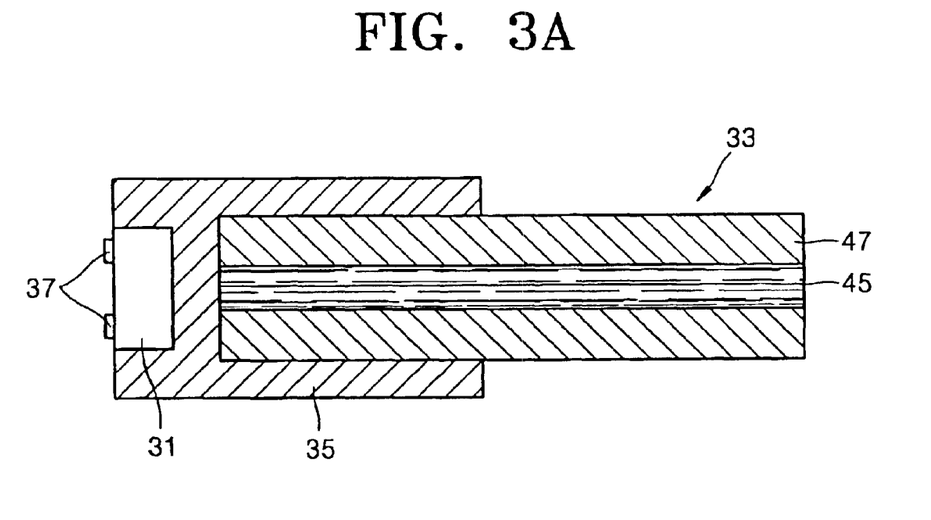
FIG. 3A is a cross-sectional view of an optical module according to the second illustrative and non-limiting embodiment of the present invention.
Figure 3B:
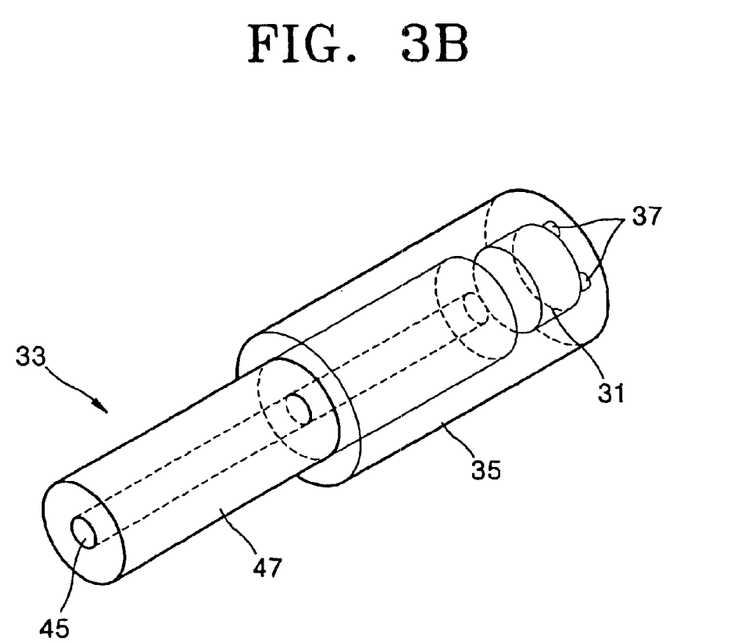
FIG. 3B is a perspective view of the optical module according to the second illustrative and non-limiting embodiment of the present invention.

As can be seen from FIGS. 3A and 3B, an optical module according to the second illustrative, non-limiting embodiment of the present invention includes: an optical device 31 for converting an optical signal into an electric signal, and vice versa; a light guide member 33 for transmitting an optical signal conveyed by the optical device 31; and a holder 35 to be formed at the end of the light guide member 33 to fix the optical axes of the optical device 31 and the light guide member 33 by aligning the two to the same point.

At a lower portion of the optical device 31, terminals 37 are installed as a path of an electric signal transmitted by the optical device 31.

As compared to the optical module of the first embodiment, the optical module of the second embodiment does not include the substrate 39 shown in FIGS. 2A and 2B, instead a wire (not shown) is installed within the optical device 31.

The optical module according to the second embodiment of the present invention has a simple structure and, thus, is easy to assemble compared to the optical module according to the first embodiment.

An electric signal transmitted from the terminal 37 is converted into an optical signal in the optical device 31 and is propagated into the light guide member 33, and an optical signal transmitted from the light guide member 33 is converted into an electric signal in the optical device 31 and is propagated into the terminal 37 again. This process is the same as the process in the optical module according to the first embodiment, and therefore, an explanation thereof will be omitted.

Figure 4A:
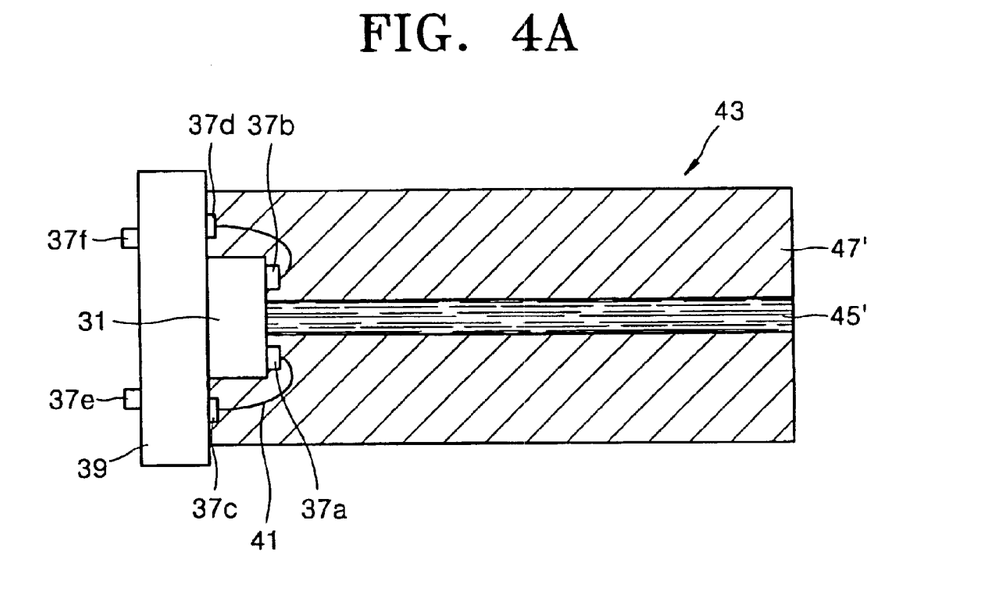
FIG. 4A is a cross-sectional view of an optical module according to the third illustrative and non-limiting embodiment of the present invention.
Figure 4B:
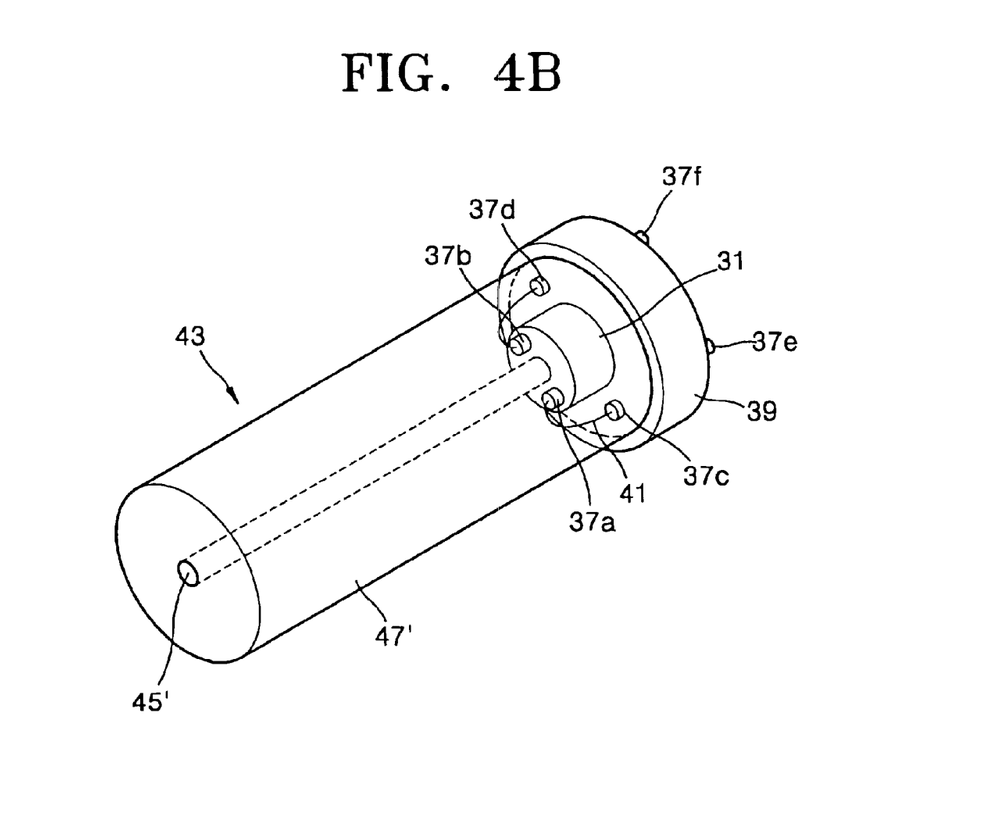
FIG. 4B is a perspective view of the optical module according to the third illustrative and non-limiting embodiment of the present invention.

Referring to FIGS. 4A and 4B, an optical module according to the third illustrative, non-limiting embodiment of the present invention includes: an optical device 31 for converting an optical signal into an electric signal, and vice versa; and a light guide member and a holder 43, at one end of which the optical device 31 is formed and in which the optical signal transmitted by the optical device 31 penetrates.

The light guide member and the holder 43 contain a core 45' made of a medium having a high refractive index and a clad 47', which is formed outside the core 45' and has a lower refractive index than the core 45'.

A medium constituting the light guide member and the holder 43 is the same as the medium making up the light guide member 33 in the optical module of the first embodiment. The light guide member and the holder 43 are fused and hardened to be attached to the optical device 31.

A substrate 39, terminals 37a through 37f and a wire 41 are positioned as illustrated in FIGS. 2A and 2B. The functions of the optical device 31, the terminals 37a through 37f, the substrate 39 and the wire 41 are the same as those of these elements described in the first and second embodiments.

In the optical module according to the third embodiment of the present invention, the light guide member and the holder 43 can perform the functions of both the light guide member 33 and the holders 35 used in the optical modules of the first and second embodiments.

An electric signal supplied from the terminals 37a through 37f is converted into an optical signal in the light emitting device 31 and transmitted to the light guide member and the holder 43. The optical signal transmitted to the light guide member and the holder 43 passes through the core 45' and is transmitted to the light receiving device 31 attached on a side of the light guide member and the holder 43. Then, the optical signal transmitted to the light receiving device 31 is converted into an electric signal and transmitted to the terminals 37a through 37f.

In the optical module according to the third embodiment, the optical signal generated by the optical device 31 can be directly transmitted to the core 45' of the light guide member and the holder 43, thereby enabling the stable transmission of the optical signal.

Figure 5A:
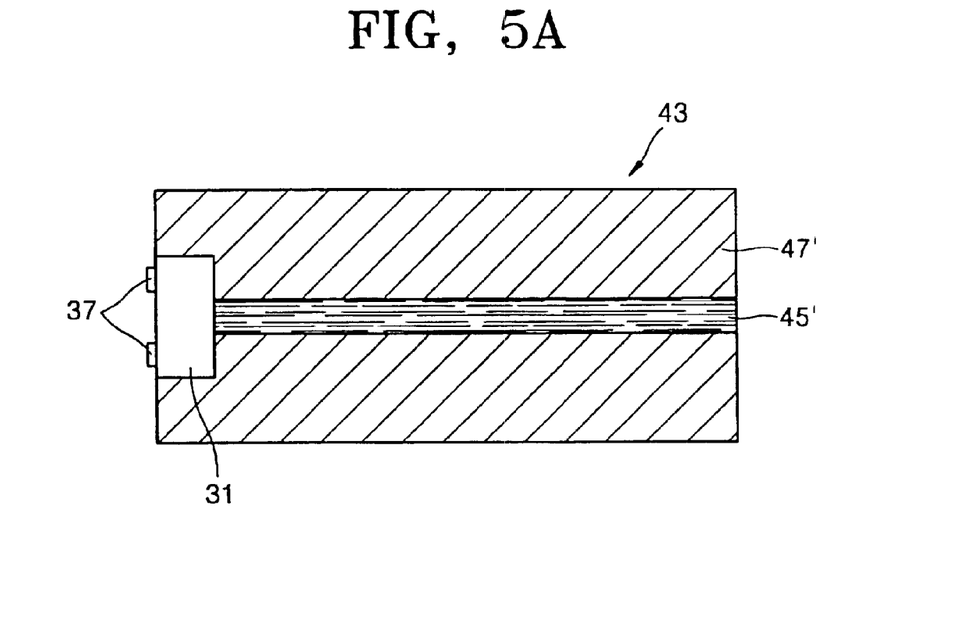
FIG. 5A is a cross-sectional view of an optical module according to the fourth illustrative and non-limiting embodiment of the present invention.
Figure 5B:
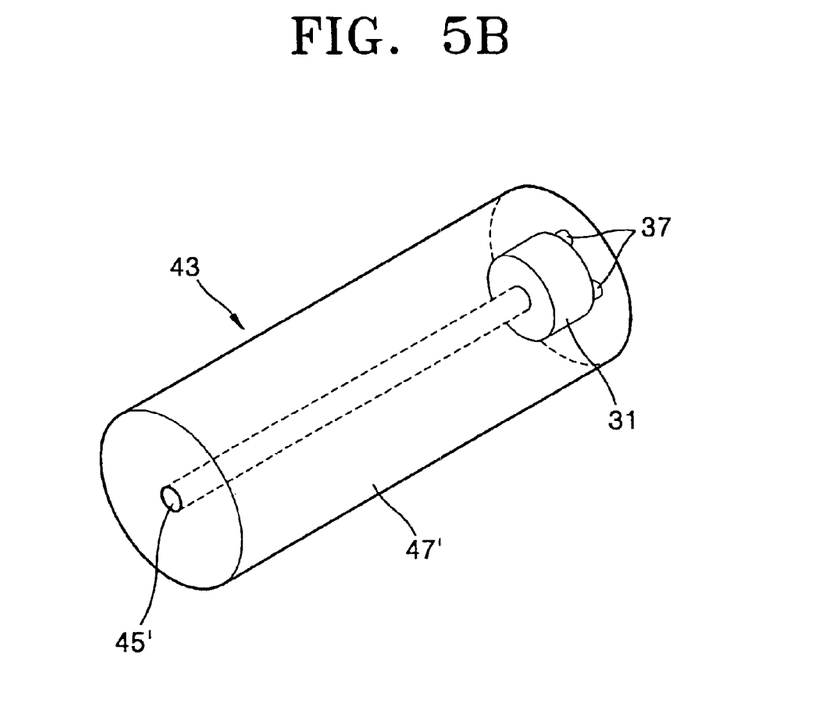
FIG. 5B is a perspective view of the optical module according to the fourth illustrative and non-limiting embodiment of the present invention.

FIGS. 5A and 5B show an optical module according to the fourth illustrative, non-limiting embodiment of the present invention. The optical module includes an optical device 31 for converting an optical signal into an electric signal, and vice versa, and a light guide member and a holder 43 which has the optical device 31 therein and through which an optical signal generated from the optical device can penetrate.

The light guide member and the holder 43 used in the optical module according to the fourth embodiment has the same structure as the light guide member and the holder 43 in the optical module according the third embodiment, and further, can perform the functions of both the light guide member 33 and the holders 35 in the optical modules according the first and second embodiments. Therefore, an explanation on the light guide member and the holder 43 in the optical module according to the fourth embodiment will be omitted.

Unlike in the optical module according to the third embodiment, the optical module according to the fourth embodiment does not include the substrate 39, and terminals 37 are installed on a lower part of the optical device 31; this constitution is similar to the characteristics of the optical module according to the second embodiment. That is, the optical module according to the fourth embodiment does not require any substrate and wire, and therefore, it is easy to manufacture.

Figure 6:
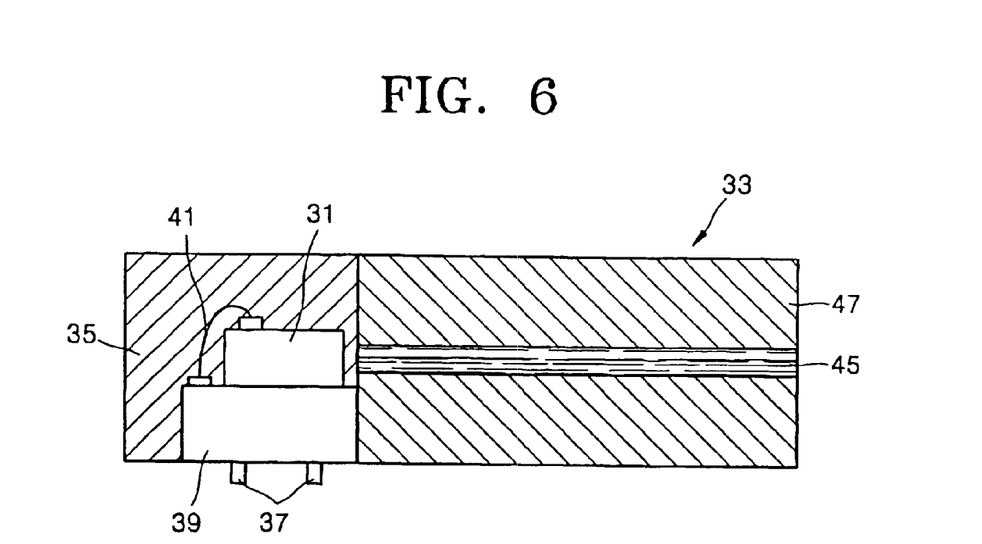
FIG. 6 is a cross-sectional view of an optical module according to the fifth illustrative and non-limiting embodiment of the present invention.

Referring to FIG. 6, the structure of an optical module according to the fifth illustrative, non-limiting embodiment of the present invention is almost identical to the optical module according to the first embodiment, but is different in that a light emitting portion or a light receiving portion of an optical device 31 is installed on a side thereof. Also, a substrate 39 including the optical device 31 thereon is formed to contact a light guide member 33 unlike in the optical module according to the first embodiment.

Functions of the optical device 31, the light guide member 33, a holder 35 and terminals 37 and a wire 41 are the same as those of these elements in the optical module according to the first embodiment. A medium of the holder 35 is also the same as the medium of the holder 35 according to the first embodiment.

Figure 7:
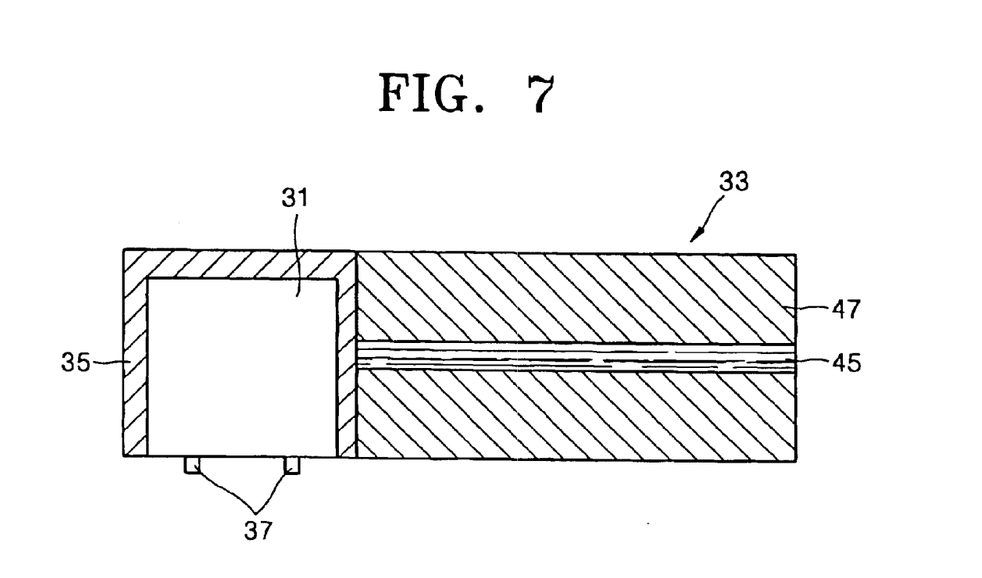
FIG. 7 is a cross-sectional view of an optical module according to the sixth illustrative and non-limiting embodiment of the present invention.

Referring to FIG. 7, the structure of an optical module according to the sixth illustrative, non-limiting embodiment of the present invention is similar to that of the optical module according to the second embodiment, but is different in that a light emitting portion or a light-receiving portion is installed on a side of an optical device 31.

Functions of the optical device 31, a light guide member 33, a holder 35 and terminals 37 are identical with those of these elements in the optical module according to the second embodiment. Also, the holder 35 is formed of the same medium used in the holder 35 according to the second embodiment.

Figure 8:
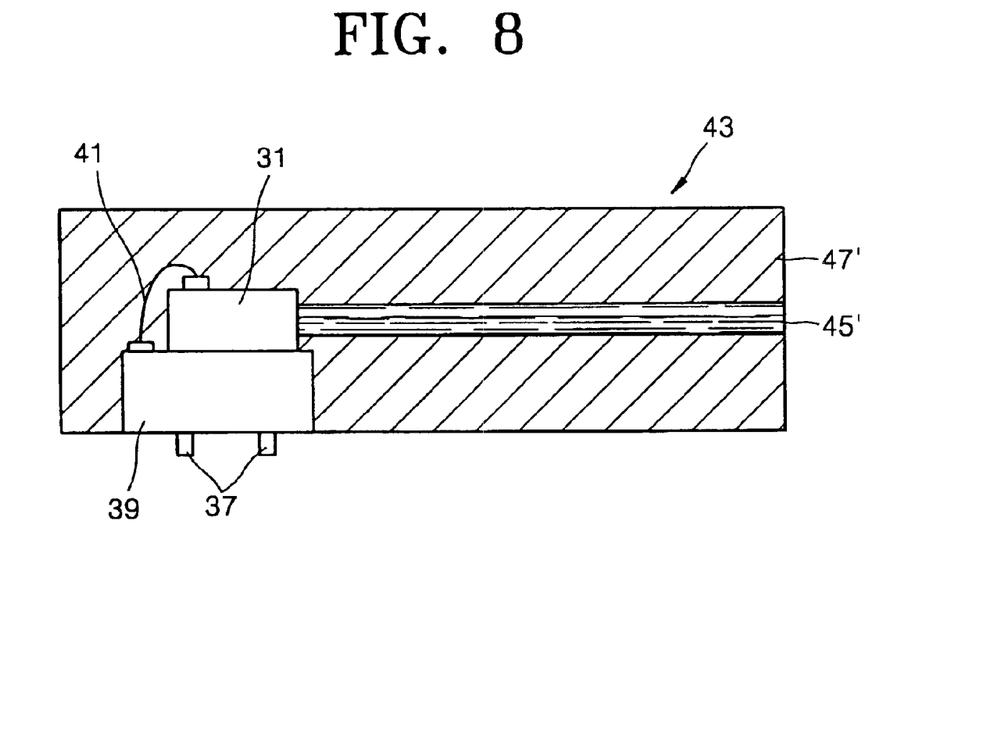
FIG. 8 is a cross-sectional view of an optical module according to the seventh illustrative and non-limiting embodiment of the present invention.

Referring to FIG. 8, the structure of an optical module according to the seventh illustrative, non-limiting embodiment is similar to that of the optical module according to the third embodiment, but is different in that a light emitting device or a light-receiving device is installed on a side of the optical device 31. Unlike the optical module according to the third embodiment, the optical module according to the seventh embodiment includes a substrate 39 having the optical device 31 thereon in a light guide member and a holder 43.

Functions of the optical device 31, the light guide member and holder 43, terminals 37 and the substrate 39 are the same as those of these elements described in the optical module according to the third embodiment. Also, the structure and medium of the light guide member and the holder 43 are the same as those of the light guide member and the holder 43 according to the third embodiment.

Figure 9:
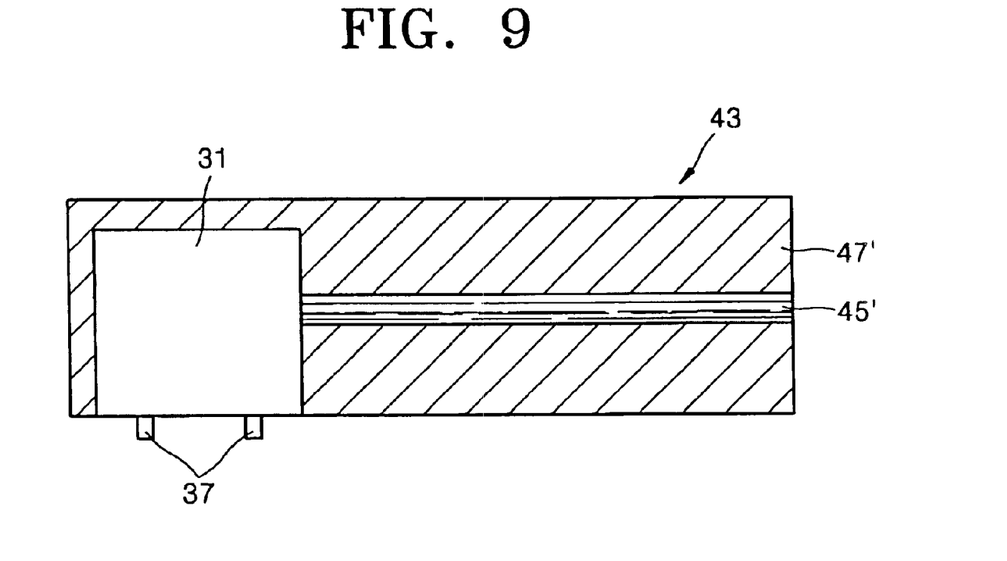
FIG. 9 is a cross-sectional view of an optical module according to the eighth illustrative and non-limiting embodiment of the present invention.

Referring to FIG. 9, an optical module, according to the eighth illustrative, non-limiting embodiment of the present invention, has a similar structure to the optical module according to the fourth embodiment, but is different from the optical module according to the fourth embodiment in that a light emitting device or light receiving device is installed on a side of an optical device 31.

In the optical module according to the eighth embodiment, the optical device 31, a light guide member and a holder 43, and terminals 37 have the same functions as those of these elements in the optical module as set forth in the fourth embodiment. Also, the structure and medium of the light guide member and the holder 43 are as described above.

Optical modules according to the embodiments of the present invention are composed of an optical device and a light guide member, and adopt a holder formed of a medium having light transmittance, thereby enabling the modules to stably transmit an optical signal.

Also, changing the optical characteristics of a medium of the holder can allow for various uses of the optical modules according to the embodiments of the present invention. Further, it is possible to easily manufacture an optical module according to the present invention by using a light guide member and a holder functioning as both a light guide member and the holder.

The above and other features of the invention including various and novel details of construction and combination of parts has been particularly described with reference to the accompanying drawings and pointed out in the claims. It will be understood that the particular construction and combination of parts embodying the invention is shown by way of illustration only and not as a limitation of the invention. The principles and features of this invention may be employed in varied and numerous embodiments without departing from the scope of the invention.

As described above, an optical module according to the present invention has advantages in that it can stably transmit an optical signal because an optical device and a light guide member are fastened by a holder formed of a medium having light transmittance, and further, it can be used in a variety of ways by changing the optical characteristics of a medium of a holder.

In addition, an optical module according to the present invention may include a light guide member and a holder that functions both as a light guide member and a holder, which makes the structure of the optical module simple, thus enabling a mass production of an optical module at a low cost.

What is claimed is:

1. An optical module comprising:
   an optical device which converts an optical signal into an electric signal, and vice versa;
   a light guide member having a core and a clad for forming an interface from which the optical signal is reflected, where the core is a path of the optical signal generated by the optical device, and the clad is installed outside the core; and
   a light transmitting holder formed on an end of the light guide member, fixes the alignment of the optical device and the light guide member along a same optical axes, the holder through which the optical signal can penetrate.

2. The optical module of claim 1, wherein the optical device is one of a light emitting device and a light receiving device.

3. The optical module of claim 2, wherein the light guide member is formed of an optical fiber.

4. The optical module of claim 2, wherein the light guide member is formed of an optical waveguide.

5. The optical module of claim 2, wherein the holder is formed of poly-methylmethacrylate (PMMA).

6. The optical module of claim 2, wherein the holder is formed of epoxy.

7. The optical module of claim 2, further comprising terminals as paths for transmitting and receiving electrical signals from the optical device.

8. The optical module of claim 7, further comprising a substrate on which the optical device and the terminals are installed.

9. An optical module comprising:
   an optical device which converts an optical signal into an electric signal, and vice versa; and
   a light guide member and a light transmitting holder, through which the optical signal generated by the optical device is transmitted, the light guide member and the holder being attached to the optical device at an end of the light guide member;
   wherein the light guide member and the holder comprises a core, which is a path of an electric signal; and
   a clad formed outside the core, wherein the core and the clad form an interface from which the optical signal is reflected.

10. The optical module of claim 9, wherein the optical device is one of a light-emitting device and a light-receiving device.

11. The optical module of claim 10, wherein the core is formed of a medium having larger refractive index than the clad.

12. The optical module of claim 10, wherein the holder is formed of PMMA.

13. The optical module of claim 10, wherein the holder is formed of epoxy.

14. The optical module of claim 10, further comprising terminals for transmitting to and receiving from the optical device the electric signal.

15. The optical module of claim 14, further comprising a substrate on which the optical device and the terminals are installed.

16. An optical module comprising:
   an optical device which converts an optical signal into an electric signal, and vice versa;
   a light guide member having a core and a clad for forming an interface from which the optical signal is reflected, where the core is a path of the optical signal generated by the optical device, and the clad is installed outside the core; and
   a light transmitting holder attached to an end of the light guide member and the optical device for fixing the alignment of the optical device and the light guide member along a same optical axes, the holder through which the optical signal can penetrate.

17. The optical module of claim 16, wherein the holder is fused to be attached to the optical device and the light guide member.

18. The optical module of claim 16, wherein the optical device is inside the holder.

19. The optical module of claim 16, wherein an end face of the light guide member is inside the holder.

20. The optical module of claim 16, wherein a distance between the light guide member and the optical device is small and wherein the optical signal penetrates through a portion of the holder between the light guide member and the optical device.

21. A method of aligning a light guide member to an optical device, comprising:
   attaching a light transmitting holder to an end of a light guide member having a core and a clad for forming an interface from which the optical signal is reflected, where the core is a path of the optical signal generated by the optical device, and the clad is installed outside the core;

attaching the holder to an optical device which converts an optical signal into an electric signal, and vice versa; and fixing the light guide member and the optical device in aligned positions by hardening said holder.

22. The method according to claim 21, wherein said attachment of the holder to the optical device is performed by fusing.

* * * * *